United States Patent

Spaulding et al.

[11] Patent Number: 5,805,213
[45] Date of Patent: *Sep. 8, 1998

[54] METHOD AND APPARATUS FOR COLOR-CORRECTING MULTI-CHANNEL SIGNALS OF A DIGITAL CAMERA

[75] Inventors: Kevin E. Spaulding, Spencerport; Richard M. Vogel, Pittsford; Jeffrey R. Szczepanski, Rochester, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 569,645

[22] Filed: Dec. 8, 1995

[51] Int. Cl.$^6$ ....................................................... H04N 9/64
[52] U.S. Cl. .......................... 348/222; 348/226; 348/223; 348/227
[58] Field of Search ..................................... 348/223–229, 348/254, 649–654, 671; H04N 9/64, 9/73

[56] References Cited

U.S. PATENT DOCUMENTS

| | | | |
|---|---|---|---|
| 3,697,174 | 10/1972 | McCune | 355/38 |
| 5,016,094 | 5/1991 | Kaneko | 348/227 |
| 5,019,894 | 5/1991 | Hieda et al. | 348/224 |
| 5,037,198 | 8/1991 | Gaboury | 356/218 |
| 5,253,047 | 10/1993 | Machishma | 358/44 |
| 5,504,525 | 4/1996 | Suzuki | 348/226 |
| 5,526,048 | 6/1996 | Yamamoto | 348/223 |

*Primary Examiner*—Glenton B. Burgess
*Attorney, Agent, or Firm*—Raymond L. Owens

[57] ABSTRACT

Multi-channel color image signals from a digital camera having multi-channel image sensors are corrected to account for variations in scene illuminant. This is accomplished by determining the scene illuminant and determining an optimum color-correction transformation in response to the scene illuminant which transform minimizes color errors between an original scene and a reproduced image by adjusting three or more parameters.

29 Claims, 9 Drawing Sheets

METHOD AND APPARATUS FOR COLOR-CORRECTING MULTI-CHANNEL SIGNALS OF A DIGITAL CAMERA

FIELD OF THE INVENTION

This invention pertains to the field of digital imaging, and more particularly to the color-correction of images obtained with digital cameras.

BACKGROUND OF THE INVENTION

Digital cameras are becoming increasingly common both in the field of still photography, as well as in the field of motion imaging as is evidenced by the proliferation of digital cameras and video recorders. Digital imaging has the advantage over its counterparts, which utilize conventional media such as silver halide film, that the results are instantly available for viewing, editing, printing, and other forms of utilization.

A characteristic of color digital imaging devices is that the digital signals produced by the image sensor will be a function of the spectral characteristics of the light used to illuminate the scene. For example, if the color processing in a camera is designed to give good color reproduction in a daylight illumination condition, unacceptable color reproduction may be obtained if the camera is used with tungsten, flash, or fluorescent illumination. This is due to the fact that the response measured by the color sensors is a function of the spectral power distribution of the light source as well as the spectral reflectance of the objects in the scene, and the spectral responsivities of the sensors.

Consider a digital camera having color image sensors that are nominally sensitive to the red, green, and blue portions of the visible spectrum. The linear color signals produced by the camera will be given by $$R = k_R \int I(\lambda) R(\lambda) S_R(\lambda) d\lambda \quad (1)$$
$$G = k_G \int I(\lambda) R(\lambda) S_G(\lambda) d\lambda$$
$$B = k_B \int I(\lambda) R(\lambda) S_B(\lambda) d\lambda,$$

where R, G, and B are the red, green, and blue color values, respectively. $I(\lambda)$ is the spectral power distribution of the illuminant. $R(\lambda)$ is the object spectral reflectance. $S_R(\lambda)$, $S_G(\lambda)$, and $S_B(\lambda)$ are the spectral responsivities of the red, green, and blue sensors, respectively. The constants $k_R$, $k_G$, and $k_B$ are channel dependent gain factors. Typically, these gain values are chosen so that equal color signal levels (R=G=B) are obtained when a neutral object is photographed.

Generally, the RGB color signals produced by the color sensors are not appropriate for display on any given color image display device. Examples of typical display devices include video displays, and digital printers. As shown in FIG. 1, a color-correction transformation 12 can be used to transform the RGB color signals produced by the color image sensors 10 to form device color signals appropriate for the intended image display, and tone-scale transformations 14 can be used to produce the desired tone-scale characteristics between the scene and the display. To accomplish this, it is necessary to know how the RGB color signals produced by the color sensors correspond to the perceived color values of the color stimulus in the scene as perceived by a human observer, and additionally how to produce the same perceived color on the display device. CIE tristimulus values (X, Y, and Z) are typically used to characterize the response of the human visual system to a color stimulus $$X = k_X \int I(\lambda) R(\lambda) \bar{x}(\lambda) d\lambda \quad (2)$$
$$Y = k_Y \int I(\lambda) R(\lambda) \bar{y}(\lambda) d\lambda,$$
$$Z = k_Z \int I(\lambda) R(\lambda) \bar{z}(\lambda) d\lambda$$

where $\bar{x}(\lambda)$, $\bar{y}(\lambda)$, and $\bar{z}(\lambda)$ are the CIE color matching functions, and the constants $k_X$, $k_Y$, and $k_Z$ are normalization factors. If the sensor spectral responsivities of the detectors are linear combinations of the CIE color matching functions $$S_R(\lambda) = a_{RX}\bar{x}(\lambda) + a_{RY}\bar{y}(\lambda) + a_{RZ}\bar{z}(\lambda)$$
$$S_G(\lambda) = a_{GX}\bar{x}(\lambda) + a_{GY}\bar{y}(\lambda) + a_{GZ}\bar{z}(\lambda), \quad (3)$$
$$S_B(\lambda) = a_{BX}\bar{x}(\lambda) + a_{BY}\bar{y}(\lambda) + a_{BZ}\bar{z}(\lambda)$$

it can be seen, by substituting equation (3) into equation (1), and converting to matrix notation, that the tristimulus values of a color stimulus the scene can be determined from the RGB color values by the relationship $$\begin{vmatrix} X \\ Y \\ Z \end{vmatrix} = \overline{M}_C \begin{vmatrix} R \\ G \\ B \end{vmatrix} \quad (4)$$

where $\overline{M}_C$ is a camera color-correction matrix given by $$\overline{M}_C = \begin{vmatrix} \frac{k_R a_{RX}}{k_X} & \frac{k_R a_{RY}}{k_Y} & \frac{k_R a_{RZ}}{k_Z} \\ \frac{k_G a_{GX}}{k_X} & \frac{k_G a_{GY}}{k_Y} & \frac{k_G a_{GZ}}{k_Z} \\ \frac{k_B a_{BX}}{k_X} & \frac{k_B a_{BY}}{k_Y} & \frac{k_B a_{BZ}}{k_Z} \end{vmatrix}^{-1} \quad (5)$$

Typically, the sensor spectral responsivities will not be linear combinations of the color-matching functions so that the matrix relationship given in Eq. (4) will not be strictly true, but in most cases a camera color-correction matrix can be computed using optimization techniques so that Eq. (4) represents a reasonable approximation.

Once the scene tristimulus values are known, the next step is to determine the desired tristimulus values to be produced on the image display device. Typically, the illuminant for the original scene photographed by the camera will be different from the reference illuminant of the image display device. As a result, the tristimulus values of a white object in the scene will be different than the tristimulus values of an object that appears to be white on the image display device. However, a human observer will perceive them both to be white because of the chromatic adaptation capabilities of the human visual system. Therefore, in order to insure that a white object in the scene will appear to be white on the image display device, it is necessary to apply a chromatic adaptation transformation to the scene tristimulus values to determine the appropriate image display device tristimulus values. One such chromatic adaptation transformation that is frequently applied is the well-known Von-Kries transformation. In the case of the Von-Kries transformation, as well as many other simple chromatic adaptation transformations, the chromatic adaptation transformation can be accomplished using a simple matrix multiplication $$\begin{vmatrix} X_d \\ Y_d \\ Z_d \end{vmatrix} = \overline{M}_{CA} \begin{vmatrix} X \\ Y \\ Z \end{vmatrix} \tag{6}$$

where $X_d$, $Y_d$, and $Z_d$ are the tristimulus values appropriate for the display device, and $\overline{M}_{CA}$ is the chromatic adaptation matrix which is a function of the reference whites for the scene and the display device.

To produce the desired color on some display device, it is necessary to use a device model to determine what device control signals will produce the desired color. A video display is a common output device for a digital image. Video displays can typically be modeled quite accurately by a non-linear function describing the tone response of the video circuitry, followed by the application of a phosphor matrix that is related to the colors of the video phosphors. Typically, the non-linearity is approximately of the form $$R_c = \left(\frac{R_d}{255}\right)^\gamma \tag{7}$$

$$G_c = \left(\frac{G_d}{255}\right)^\gamma,$$

$$B_c = \left(\frac{B_d}{255}\right)^\gamma$$

where $R_d$, $G_d$, and $B_d$ are the device color signals, $\gamma$ is a contrast parameter, and $R_c$, $G_c$, and $B_c$ are the linear intensity color signals. A phosphor matrix, $\overline{M}_P$, is used to determine the device tristimulus values from the linear intensity control signals:

$$\begin{vmatrix} X_d \\ Y_d \\ Z_d \end{vmatrix} = \overline{M}_P \begin{vmatrix} R_c \\ G_c \\ B_c \end{vmatrix}. \tag{8}$$

Therefore, to determine the device control signals necessary to produce a desired color, it is necessary to invert these operations by first applying the inverse phosphor matrix $$\begin{vmatrix} R_c \\ G_c \\ B_c \end{vmatrix} = \overline{M}_P^{-1} \begin{vmatrix} X_d \\ Y_d \\ Z_d \end{vmatrix} \tag{9}$$

followed by the inverse of the non-linear tone response function.

To compute the device control signals from the camera color values the operations given in Eqs. (4), (6), and (9) should be applied sequentially. These equations represent sequential matrix operations that can therefore be combined into a single matrix operation $$\begin{vmatrix} R_c \\ G_c \\ B_c \end{vmatrix} = \overline{M}_P^{-1} \overline{M}_{CA} \overline{M}_C \begin{vmatrix} R \\ G \\ B \end{vmatrix} = \overline{M}_{CC} \begin{vmatrix} R \\ G \\ B \end{vmatrix}, \tag{10}$$

where $\overline{M}_{CC}$ is a composite color-correction matrix given by $$\overline{M}_{CC} = \overline{M}_P^{-1} \overline{M}_{CA} \overline{M}_C \tag{11}$$

Due to implementation speed considerations, this composite color-correction matrix would typically be applied in the color-correction transformation 12 rather than the sequence of individual matrices. Note that if the channel dependent gain factors are set up so that neutral objects produce equal RGB color values, and if the output device has the usual characteristic that equal RGB device control signals produce a neutral image, then the composite color-correction matrix will have the feature that equal color values must produce equal device control signals. This is normally accomplished by requiring that the composite color-correction matrix have row-sums equal to 1.0. Following the color-correction matrix operation, tone-scale transformations 14 which typically approximate the inverse of the device non-linearity.

Usually, the color-correction operation is optimized for a particular assumed scene illuminant, as well as a particular output device. If the actual scene illuminant is different than the assumed scene illuminant, the color-correction operation will not produce the desired result. This is due to the fact that the different scene illuminant will have a different spectral content, and will therefore produce different RGB color values than the reference scene illuminant. The most noticeable result will usually be that neutral colors in the scene will not map to neutral colors on the display. This can easily be seen by noting that if the color-correction operation were set up so that the color-correction operation produces equal device control signals given equal RGB color values, then it will produce unequal control signals from non-equal RGB color values. As a result, the image will appear to have a color cast when the image is displayed. For example, if a camera is set up to produce equal RGB signals for daylight illumination, and the camera is then used to photograph a scene under tungsten illumination, the resulting image will generally appear to have a yellowish cast due to the fact that the spectral power distribution associated with tungsten illumination has a much lower level of blue content than the spectral power distribution associated with daylight.

To account for this illuminant dependence, many systems have implemented a form of illuminant dependent gain control like that shown in FIG. 2. In this case, a digital camera has red, green and blue image sensors 20 to detect light imaged from a scene onto the sensors, and produces color signals R, G, and B. An illuminant determining process 22 determines the illuminant dependent gain factors $G_R$, $G_G$, and $G_B$ that are applied to the color signals using multipliers 24 to produce white-balanced color signals $R_W$, $G_W$, and $B_W$. Note that if the color signals are not in a linear space the application of the gain factors will require a more complex operation than a simple multiplication. In such cases, the gain factors can be applied using functional operations, or alternatively by applying look-up-tables (LUTs). Another approach would involve using linearization functions or linearization LUTs to first convert the color signals to linear color signals where the gain factors could then be applied by a simple multiplication. The white-balanced color signals are then color-corrected using a color-correction transformation 26 and processed through tone-scale transformations 28 to produce device color signals, $R_d$, $G_d$, and $B_d$, appropriate for the intended image display device. The illuminant dependent gain factors are generally chosen so that the white-balanced color signals produced by photographing a neutral patch will be approximately equal.

A number of types of illuminant determining processes have been used in the prior art. One such type of illuminant determining process is an optical color temperature detector disposed on the front of the camera. Another type of illuminant determining process includes the step of having a user identify a neutral patch in a captured image and computes the gain factors that would be necessary to equalize the color signals for that patch. Still another type of illuminant determining process includes having a user choose an illuminant type from a list of possible illuminant types. The list of possible illuminant types might include classes of illuminants such as daylight, tungsten, flash, and fluorescent.

The use of illuminant dependent gain factors will allow for the correction of the overall neutral balance of the image, but there will still be residual color reproduction errors associated with this simple illuminant correction approach. For example, although a gray patch in the image should be reproduced as gray, a red patch in the image may be reproduced with an incorrect hue angle. This is due to the fact that the color-correction operation was designed for the assumed scene illuminant, thus the camera model and the chromatic adaptation correction may not be appropriate for the actual scene illuminant. In order to fix the remaining color reproduction errors, it is not possible to simply adjust the channel-independent gain factors. Instead, the color-correction transformation must by modified as well.

In U.S. Pat. No. 5,253,047 Machishima has recently disclosed a method for using a color temperature detecting circuit to modify the matrix coefficients for the primary color separator used to perform a color-correction operation for a color video camera. The primary color separator is used to compute the red, green and blue primary color signals from the luminance/chrominance signals generated by the camera detector circuitry. In particular, two constants, referred to as $\alpha$ and $\beta$, are varied in response to the signal from the color temperature detecting circuit. This approach allows for some degree of compensation for variations in the scene illuminant, but it has the disadvantage that it does not permit for optimum correction because it does not allow for using all of the degrees-of-freedom available in the primary color separator matrix. Further, it has the disadvantage that the color-correction operation can not be optimized for each illuminant type so as to minimize average color errors.

SUMMARY OF THE INVENTION

It is an object of the present invention to color-correct multichannel color image signals from a digital camera to account for variations in scene illuminant including the steps of determining the scene illuminant, and determining an optimum color-correction transformation, adapted to process the color image signals, that minimizes color errors between an original scene and a reproduced image responsive to the scene illuminant.

This object is achieved by a method for color-correcting multichannel color image signals from a digital camera having multi-channel image sensors to account for variations in scene illuminant including the steps of:

a) determining the scene illuminant; and b) determining an optimum color-correction transformation in response to the scene illuminant which transform minimizes color errors between an original scene and a reproduced image by adjusting three or more parameters.

ADVANTAGES

The present invention has the advantage that the color-correction process for digital camera images can be optimized as a function of the scene illuminant rather than making the compromises associated with optimizing the process for a single illuminant.

It has the additional advantage that the parameters of the color-correction process determined for each illuminant produce the minimum average color errors given the degrees of freedom associated with the color-correction transformation.

DETAILED DESCRIPTION OF THE INVENTION

Figure 1:
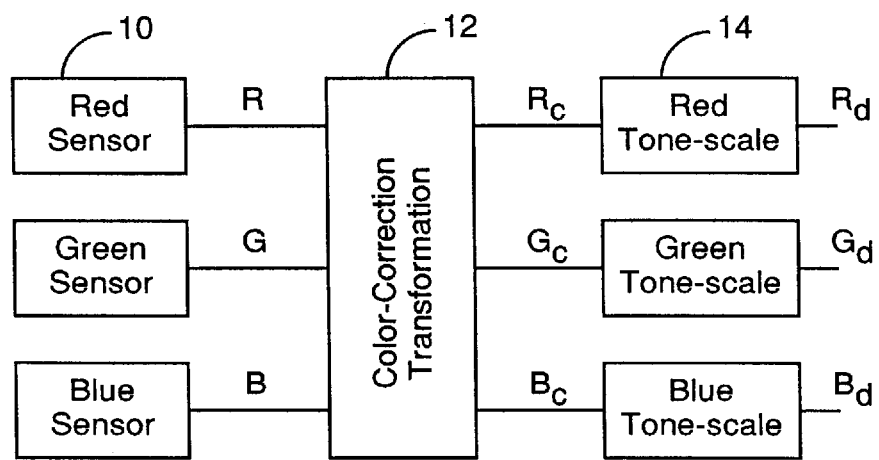
FIG. 1 shows a prior art color-correction process for a digital camera.
Figure 2:
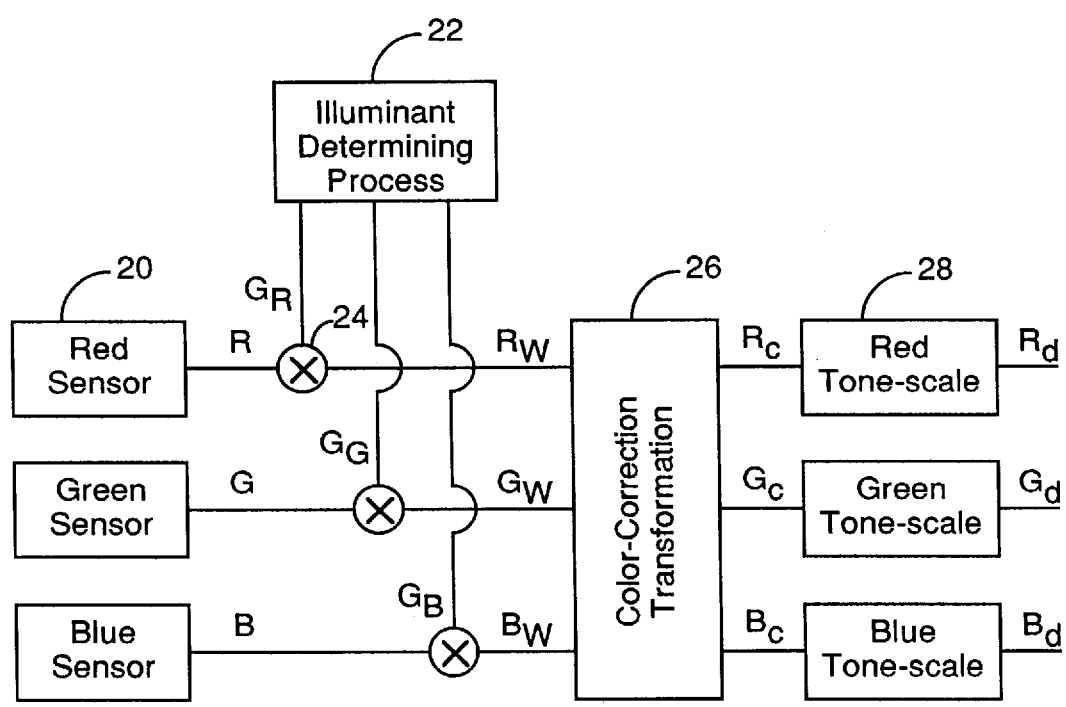
FIG. 2 shows a prior art color-correction process for a digital camera which uses an illuminant detecting process to apply channel-dependent gain factors.
Figure 3:
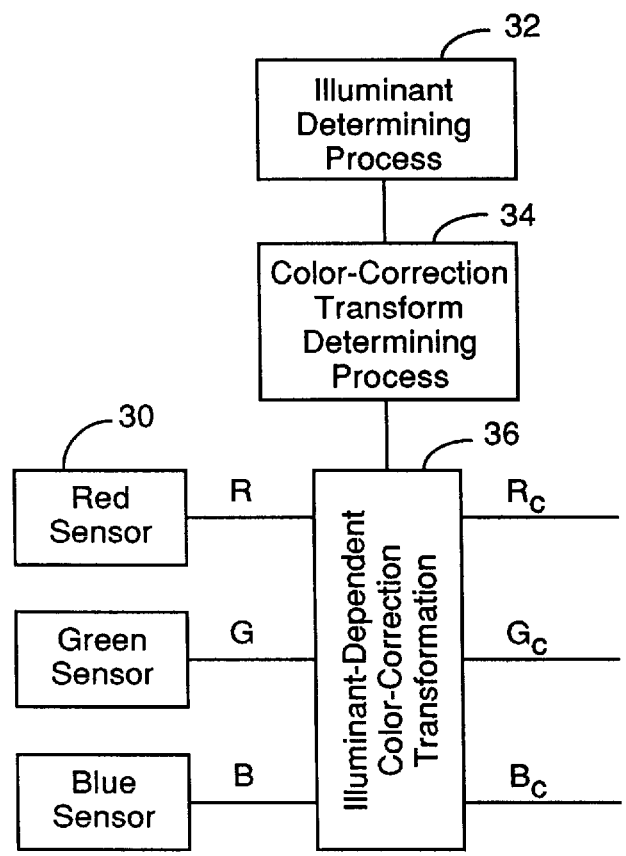
FIG. 3 shows a color-correction process according to the present invention which uses an illuminant determining process to determine an illuminant-dependent color-correction transformation.

Referring now to FIG. 3, a generic system for practicing the present invention will be described. A digital camera has multi-channel color image sensors 30 to detect light imaged from a scene onto the sensors. The digital camera may be a digital still camera, or a digital video camera. In many common digital cameras there are three types of color sensors having spectral sensitivities that are generally red, green, and blue. For purposes of illustration we will consider a camera having sensors of this type, but it is clear that the method of the present invention can easily be extended to cameras having other types of color sensors such as cyan, magenta, and yellow, or cyan, magenta, yellow, and green. The multi-channel color image sensors produce multi-channel color signals shown in FIG. 3 as R, G, and B. An illuminant determining process 32 determines the illuminant incident on the scene. A color-correction transform determining process 34 determines an optimum color-correction transformation 36 responsive to the determined illuminant. The optimum color-correction transformation 36 can then be used to process the multi-channel color signals to form device color signals $R_d$, $G_d$, and $B_d$. The multi-channel output signals will generally be adapted for display on a particular form of output device such as a video display. Alternatively, the multi-channel output signals may be device-independent color values. In this case, the device-independent color values can then be transformed to device-dependent color values for one or more output devices using device profiles that transform device-independent color values into the appropriate device-dependent color values for a particular output device. This last approach is used by systems commonly known as color-management systems.

A number of types of illuminant determining processes 32 can be used. One such type of illuminant determining process is an optical color temperature detector disposed on the front of the camera. Another type of illuminant determining process includes the steps of having a user identify a neutral patch in a captured image, and characterizing the illuminant based on the relative color signals for the neutral patch. A variation on this process would include having the user photograph a specific neutral target as part of a camera calibration procedure that would be performed each time the scene illuminant changes. Still another type of illuminant determining process includes having a user choose an illuminant type from a list of possible illuminant types. The list of possible illuminant types might include classes of illuminants such as daylight, tungsten, flash, and fluorescent. Another type of illuminant determining process would include analyzing the color signals for the captured digital image to estimate the illuminant characteristics from the image information. Methods of this type might include finding specular highlights in the scene, or analyzing highlight to shadow transitions in the scene. Yet another type of illuminant determining process includes characterizing the illuminant using a color measurement device such as a spectroradiometer, or a colorimeter.

The process for determining the optimum color-correction transformation 34 includes determining a color-correction transformation that minimizes the color errors between the scene and the reproduced image given the determined scene illuminant. In one embodiment of the present invention, the color-correction transformation may be implemented using a color-correction matrix as was shown above in Eq. (10), where the matrix coefficients are adjustable. In this case, the process of determining the optimum color-correction transformation involves determining the adjustable matrix coefficient values that minimize the color errors between the scene and the reproduced image.

Generally, the optimization process may involve using a least-squares minimization technique to minimize the color errors for a specific set of scene color values. The set of scene colors used in the optimization process can include colors spanning the range of real world colors, as well as colors of particular importance such as skin-tones and neutral colors.

The scene color values for the set of scene colors can be computed using well-known procedures given the spectral characteristics of the scene colors, and the determined illuminant. If the spectral characteristics of the scene illuminant have not been directly measured, they can be estimated using the information provided by the illuminant determining process. For example, if only the estimated color temperature of the illuminant has been measured, an appropriate illuminant spectrum having the desired color can be assumed. Alternatively, if the illuminant has been determined by having the user choose from a set of possible classes of illuminants, a representative illuminant spectrum for that class of illuminants can be assumed.

The color of the reproduced image associated with a given color-correction transformation can either be characterized by reproduced color values for a set of scene colors produced using a particular output device, such as a video display or a printer, or can characterized by device-independent color values adapted for conversion to device-dependent color values at a later time. The reproduced color values can either be measured from an actual captured image of a test target, or they can be determined from a knowledge of the spectral sensitivities of the sensors.

The differences between the perceived scene color values and the reproduced color values can be used to determine a combined color error. One form of combined color error that can be computed for a given color-correction transformation is the root-mean-square (RMS) color error. One measure of color error that is frequently convenient to compute is the distance between the scene color and the reproduced color in a device-independent color space such as the well-known CIE tristimulus value color space. Other color spaces that can be used would include so-called uniform color spaces such as CIELAB or CIELUV, or device-dependent color spaces (such as video RGB code values). Depending on the form of the color-correction transformation and the form of the combined color error metric, it may be possible to determine the optimum color-correction transformation parameter values using simple linear least squares techniques, or it may be necessary to use non-linear optimization methods. Examples of non-linear optimization methods include iterative Simplex optimization procedures, simulated annealing techniques, and genetic algorithms.

The optimum color-correction transformation 36 can take many forms. For example, it might include a simple matrix operation having adjustable matrix coefficients, it might include a series of matrix and look-up table operations having a set of adjustable parameters, or it might include an adjustable three-dimensional look-up table (3-D LUT). In yet another embodiment, the optimum color-correction transformation can be a set of one-dimensional functions applied to each of the multi-channel color signals. Because of the fact that there are typically three color channels, there will usually be a minimum of three parameters that can be adjusted during the optimization process. For example, a color-correction matrix will have nine adjustable matrix coefficients, and a 3-D LUT will have a number of adjustable parameters given by the number of lattice points in the 3-D LUT.

In one embodiment of the present invention, the color image sensors 30, and the illuminant determining process 32 are integral parts of the digital camera. The information regarding the illuminant determined from the illuminant detector is stored as a part of a digital image data structure used to store the multi-channel color signals. The digital image data structure is then processed at a later time using a digital image processor adapted to receive the digital image from the digital camera. The digital image processor might be a computer workstation, or a specialized image processing device. The digital image processor performs the color-correction transformation determining process 34 and applies the optimum color-correction transformation 36 to the multi-channel color signals to form multi-channel output signals. The information regarding the illuminant that is stored as a part of a digital image data structure might be raw signal values produced by the illuminant detector, color signals corresponding to a neutral object in the scene, an estimated illuminant color temperature, a measured illuminant spectra, or some other parameter(s) that characterize the illuminant.

In another embodiment of the present invention the illuminant determining process 32 is also performed in the digital image processor. This step might include analyzing the digital image data to estimate the scene illuminant, or having a user select a scene illuminant from a set of possible scene illuminants.

In yet another embodiment of the present invention, the optimum color-correction transformation determining process 34 is performed and then the optimum color-correction transformation 36 are applied to the multi-channel color signals to form multi-channel output signals are performed by a digital image processing means integrated into the digital camera so that the output of the digital camera would be the desired multi-channel output signals.

Those skilled in the art will appreciate that other alternate embodiments are also possible. For example, the color-correction transformation determining process 34 can be performed in the camera and the resulting optimum color-correction transformation can be stored as a part of a digital image data structure used to store the multi-channel color-signals. The stored optimum color-correction transformation would include a set of parameters necessary to describe the optimum color-correction transformation. For example, the parameters might include a set of color-correction matrix coefficient values, or a set of 3-D LUT values.

Figure 4:
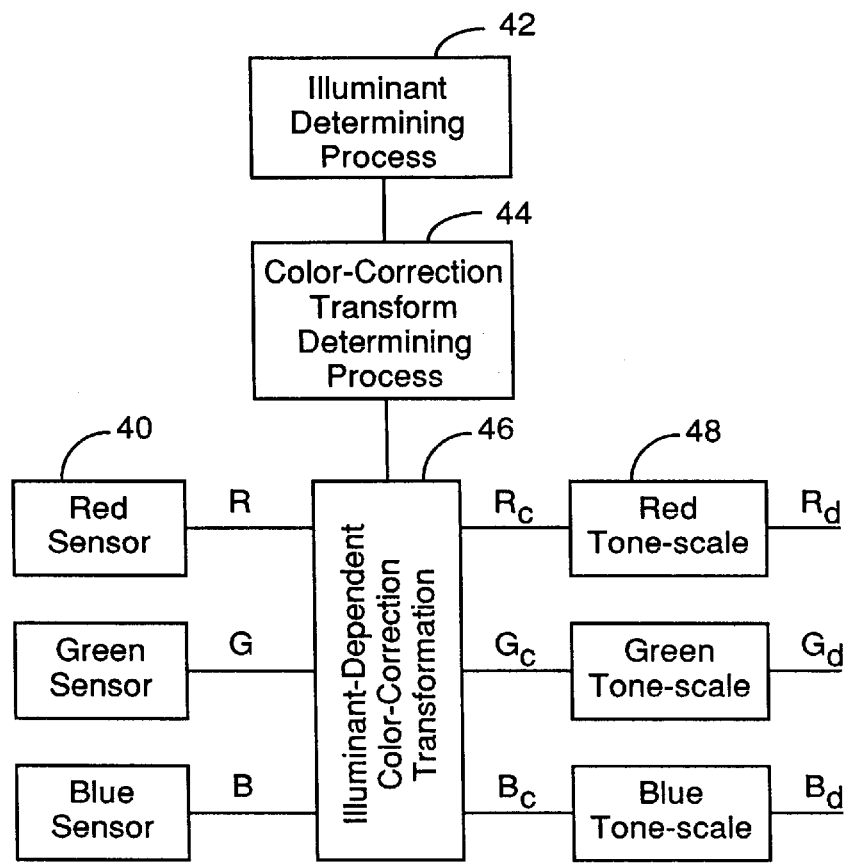
FIG. 4 shows a color-correction process according for a digital camera according to present invention which includes separate tone-scale transformations.

Frequently, the color-correction transformation may include aspects of tone-scale correction, as well as color-correction. For example, the color-correction transformation may include a 3-D LUT that represents the combined operations of converting from the sensor color values to the primary color values for a particular video display and applying a desired tone-scale function. Many times it may be convenient to include a separate step for explicitly controlling the image tone-scale. This is shown in FIG. 4, where multi-channel color signals R, G, and B are formed by image sensors 40. An illuminant determining process 42 determines the illuminant incident on the scene. A color-correction transform determining process 44 determines an optimum color-correction transformation 46 responsive to the determined illuminant. The optimum color-correction transformation 46 is used to process the multi-channel color signals to form color-corrected color signals $R_C$, $G_C$, and $B_C$. The color-corrected color signals are then processed by tone-scale transformations 48 to form device color signals $R_d$, $G_d$, and $B_d$.

Figure 5A:
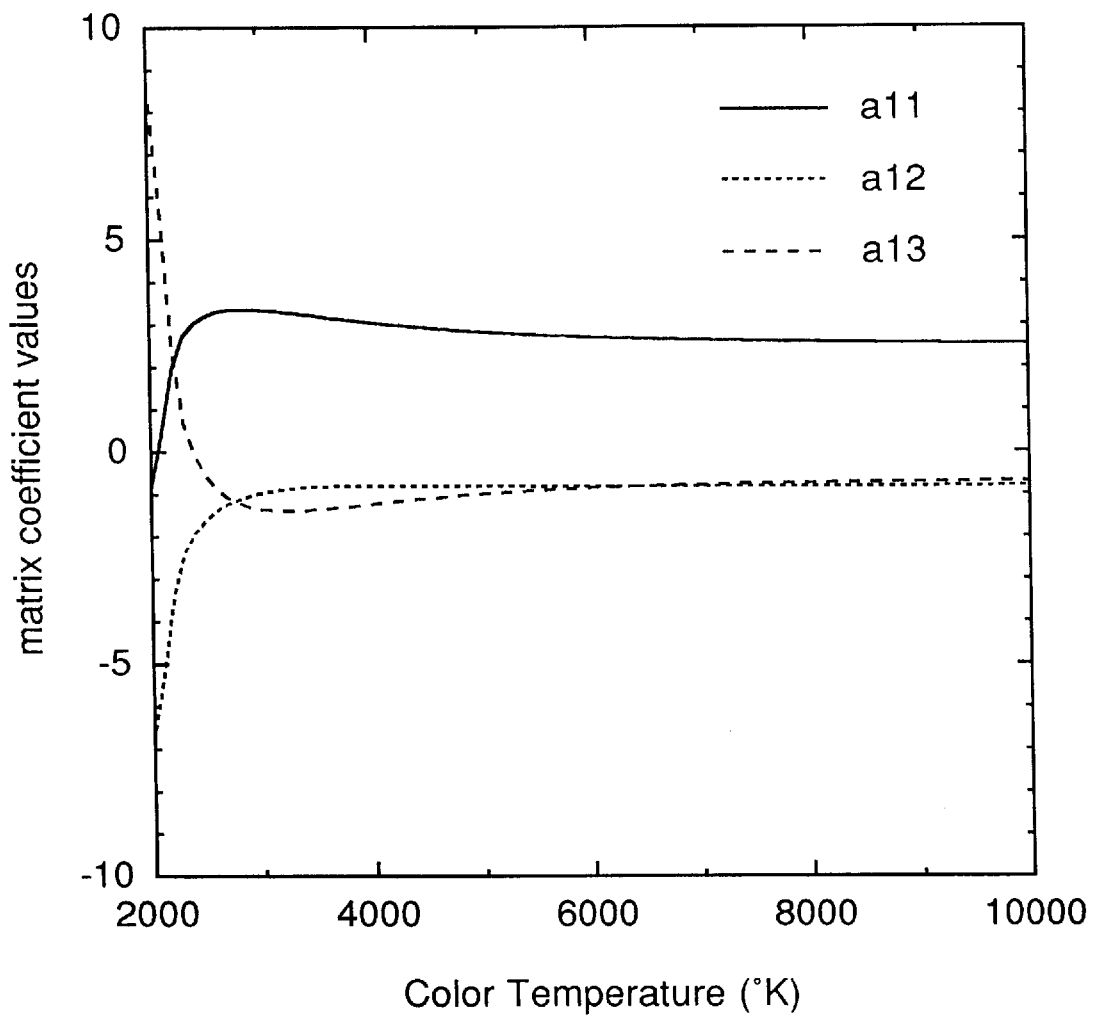
FIGS. 5a–5c shows example optimum color-correction matrix coefficients as a function of daylight color temperature determined according to the present invention.
Figure 5B:
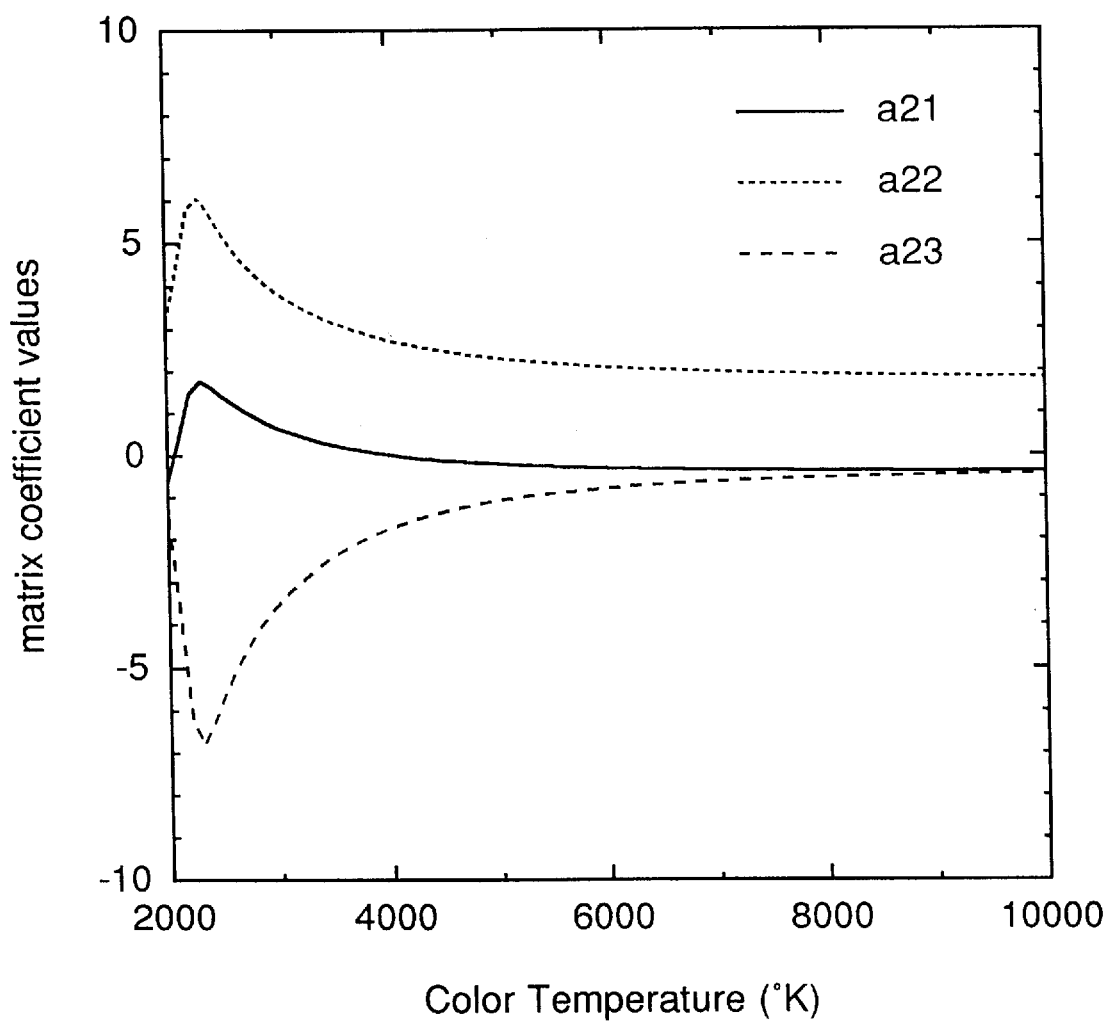
Figure 5C:
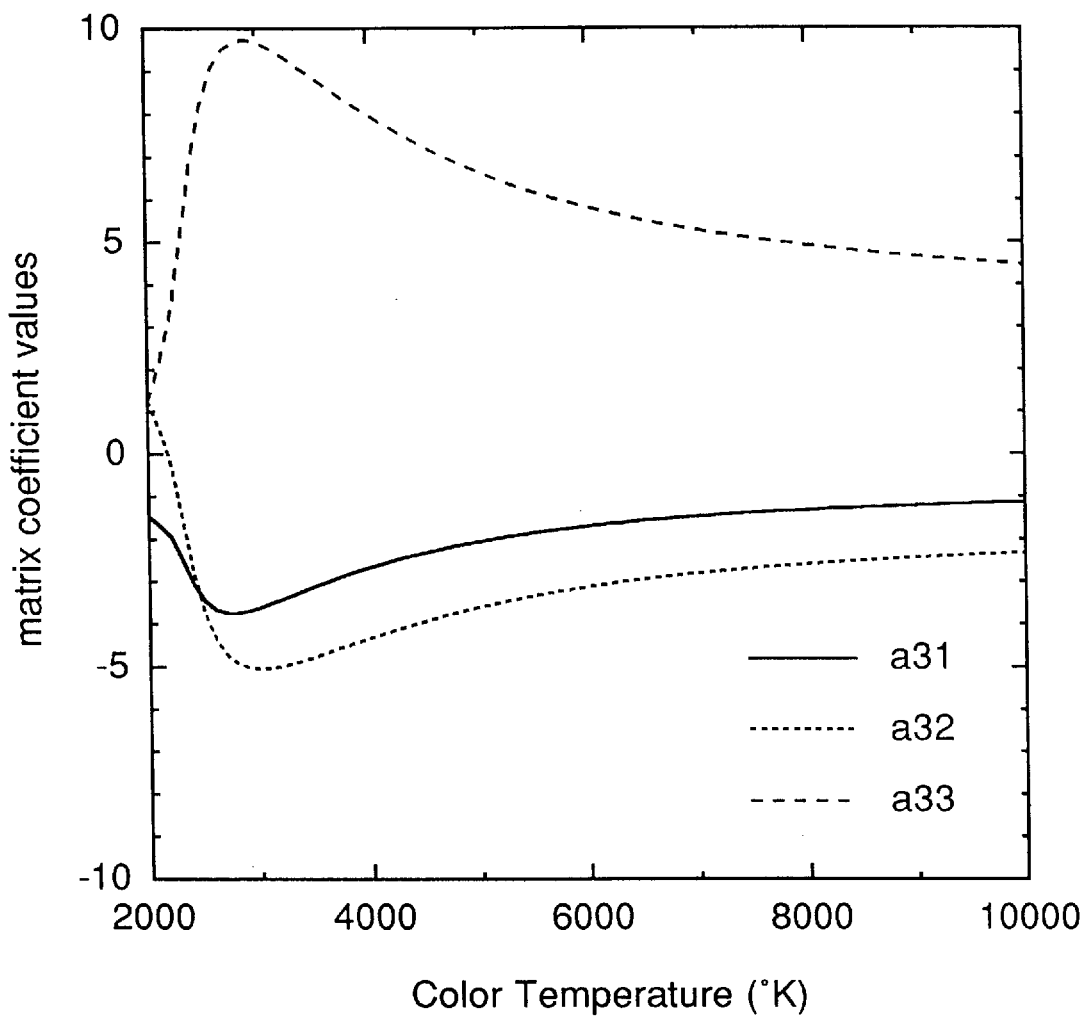

For example, consider a digital still camera having red, green, and blue sensitive color image sensors to be processed using the configuration shown in FIG. 4. In this example, the optimum color-correction transformation 46 will be a 3×3 color-correction matrix to transform from the sensor color values to output primary color values appropriate for a typical video display. FIGS. 5a–5c show the matrix coefficient values associated with an optimum color-correction transformation that are determined as a function of the color temperature of a blackbody illuminant:

$$\begin{vmatrix} R_c \\ G_c \\ B_c \end{vmatrix} = \overline{M}_{CC} \begin{vmatrix} R \\ G \\ B \end{vmatrix} = \begin{vmatrix} a11 & a12 & a13 \\ a21 & a22 & a23 \\ a31 & a32 & a33 \end{vmatrix} \begin{vmatrix} R \\ G \\ B \end{vmatrix} \quad (12)$$

The optimum matrix coefficient values were determined by cascading the blackbody illuminant spectra having the appropriate color temperature with a set of scene spectral reflectance functions to form cascaded scene spectra. The cascaded scene spectra were then used to determine the camera RGB color signals given the camera spectral sensitivities using Eq. (1), and the perceived color values for each of the patches using Eq. (2). Reproduced color values can then determined by applying the optimum color-correction transformation 46 and tone-scale transformations 48 to the camera RGB color signals to produce device color signals $R_d$, $G_d$, and $B_d$ for a CRT display. A model of the color reproduction characteristics for a CRT display can then be used to determine the reproduced color values given the device color values. In this example, a set of patches from a MacBeth Color Checker were used as scene colors, and the color errors for each patch were determined by the well-known CIELAB $\Delta E^*$ color-difference formula:

$$\Delta E^*_i = \sqrt{(L^*_{si} - L^*_{di})^2 + (a^*_{si} - a^*_{di})^2 + (b^*_{si} - b^*_{di})^2} \quad (13)$$

where $L^*_{si}$, $a^*_{si}$, and $b^*_{si}$ are the CIELAB scene color values for the $i^{th}$ color patch, $L^*_{di}$, $a^*_{di}$, and $b^*_{di}$ are the CIELAB reproduced color values for the $i^{th}$ color patch on the output device, and $\Delta E^*_i$ is the resulting color error for the $i_{th}$ patch. A standard Simplex optimization procedure was used to determine the values of the matrix coefficient values of Eq. (12) for the optimum color-correction transformation such that the RMS color error between the scene color values and the reproduced color values is minimized. The RMS color error $\Delta E^*_{RMS}$ is simply given by $$\Delta E^*_{RMS} = \sqrt{\sum_{i=0}^{N} \Delta E^{*2}_i} \quad (14)$$

where N is the number of color patches.

Figure 6:
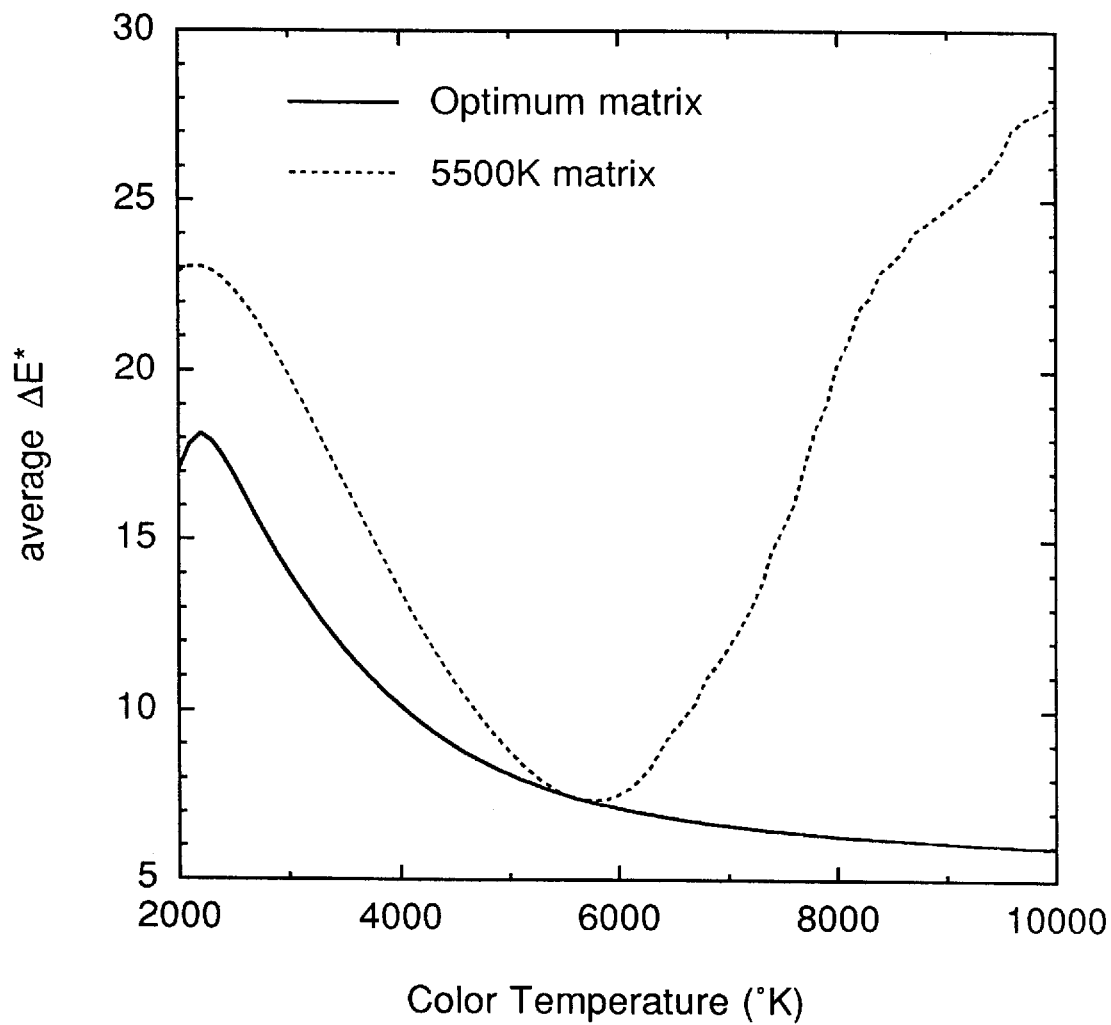
FIG. 6 shows the average color errors as a function of color temperature obtained using the present invention, compared to the average color errors obtained when a fixed color-correction matrix is used.

It can be seen in FIGS. 5a–5c that the optimum matrix coefficients vary quite substantially across the range of color temperatures investigated, particularly for lower color temperatures. The average color errors for the set of color patches calculated for the optimum color-correction matrix at each color temperature are shown in FIG. 6. For comparison, a curve is also shown for the case where the matrix that was optimized for a 5500K color temperature was used for all color temperatures. It can be seen that the color reproduction errors grow rapidly when the matrix is used at a color temperature it was not designed for. The color errors obtained when the optimum color-correction matrix is used for each color temperature are substantially smaller than those obtained for the 5500K color-correction matrix if the color temperature departs significantly from 5500K. This indicates that substantial improvements in the color reproduction characteristics of the digital camera can be obtained by varying the matrix coefficients for the color-correction transformation accordingly.

Figure 7:
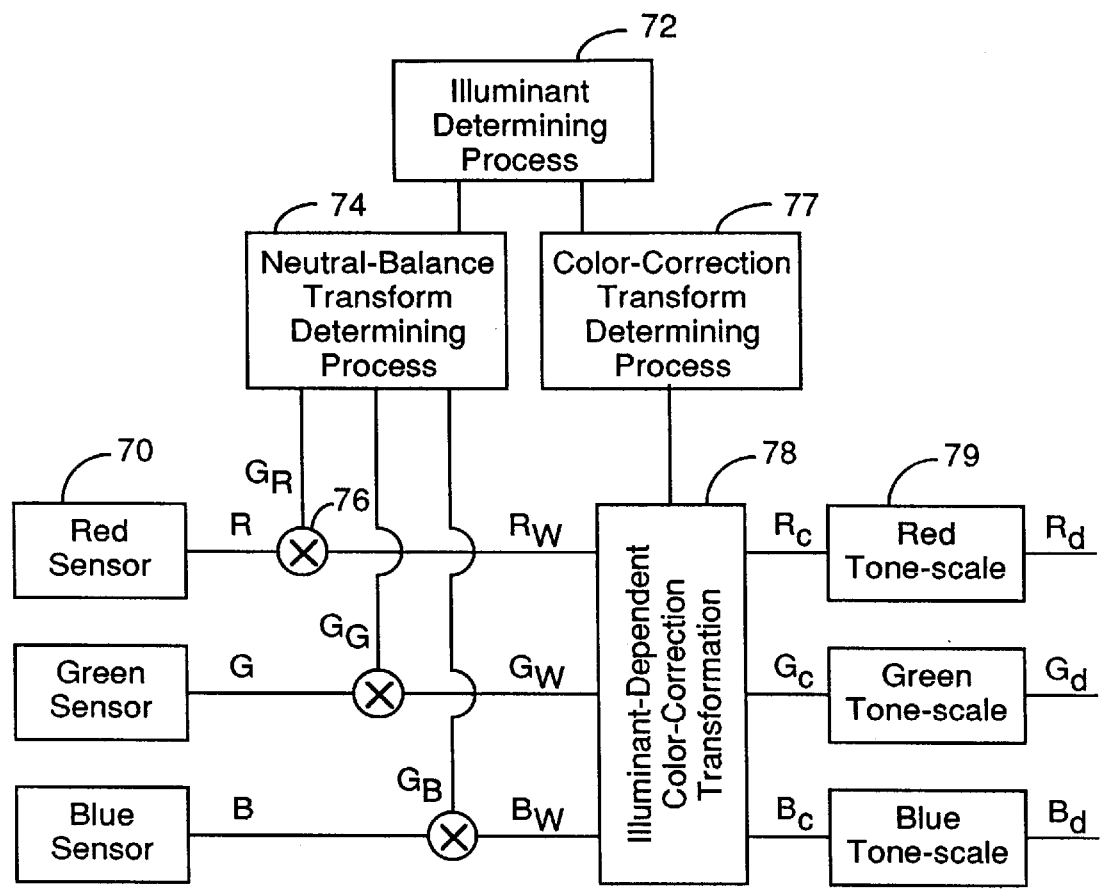
FIG. 7 shows a color-correction process according for a digital camera according to the present invention which includes separate neutral-balance transformations.

In the above example, the optimum matrix coefficients were computed with the assumption that the camera electronics are adjusted so that neutral scene colors produce equal RGB color values. This usually implies that gain factors must be applied to the color values produced by each of the color channels. These gain factors will also typically be a function of the illuminant. The application of the gain factors can be included in the optimum color-correction transformation 46, or can be treated as a separate operation. FIG. 7 shows an embodiment of the present invention which includes a separate neutral-balance correction step. A digital camera has multi-channel color image sensors 70 to detect light imaged from a scene onto the sensors. The multi-channel color image sensors produce multi-channel color signals shown in FIG. 7 as R, G, and B. An illuminant determining process 72 determines the illuminant incident on the scene. A neutral-balance transform determining process 74 determines the neutral-balance transform 76 necessary to produce neutral-balanced color signals $R_W$, $G_W$, and $B_W$. In this example, the neutral balance-transform 76 is shown as a set of simple gain factors $G_R$, $G_G$, and $G_B$ that are applied to each of the multi-channel color signals. Alternatively, the neutral balance-transform can include more complex operations such as one-dimensional look-up tables (1-D LUTs). A color-correction transform determining process 77 determines an optimum color-correction transformation 78 responsive to the determined illuminant. The optimum color-correction transformation 78 can then be used to process the neutral-balanced color signals to form color-corrected color signals $R_C$, $G_C$, and $B_C$. The color-corrected color signals are then processed by tone-scale transformations 79 to produce device color signals $R_d$, $G_d$, and $B_d$.

The invention has been described with reference to a preferred embodiment. However, it will be appreciated that variations and modifications can be effected by a person of ordinary skill in the art without departing from the scope of the invention.

| Parts List |
| --- |
| 10 color image sensors |
| 12 color-correction transformation |
| 14 tone-scale transformations |
| 20 image sensors |
| 22 illuminant determining process |
| 24 multipliers |
| 26 color-correction transformation |
| 28 tone-scale transformations |
| 30 color image sensors |
| 32 illuminant determining process |
| 34 color-correction transform determining process |
| 36 optimum color-correction transformation |
| 40 color image sensors |
| 42 illuminant determining process |
| 44 color-correction transform determining process |
| 46 optimum color-correction transformation |
| 48 tone-scale transformations |
| 70 color image sensors |
| 72 illuminant determining process |
| 74 neutral-balance transform determining process |
| 76 neutral-balance transform |
| 77 color-correction transform determining process |
| 78 optimum color-correction transformation |
| 79 tone-scale transformations |

We claim:

1. A method for color-correcting multi-channel color image signals from a digital camera having multi-channel image sensors to account for variations in scene illuminant comprising the steps of:
   a) determining the scene illuminant; and
   b) determining an optimum illuminant-dependent color-correction transformation based on the determined scene illuminant which transformation minimizes color errors between an original scene and a reproduced image when applied to the multi-channel color signals to produce multi-channel color output signals, each of such multi-channel color output signals being dependent upon more than one of the multi-channel color image signals.

2. The method of claim 1 wherein the scene illuminant is determined using an optical color temperature detector on the digital camera.

3. The method of claim 1 wherein the scene illuminant is determined from the relative color signals produced by photographing a neutral object in the scene.

4. The method of claim 1 wherein the scene illuminant is determined by analyzing the color image data for the scene.

5. The method of claim 1 wherein the scene illuminant is determined by having a user select the scene illuminant from a list of scene illuminants.

6. The method of claim 1 wherein the digital camera is a digital still camera.

7. The method of claim 1 wherein the digital camera is a digital video camera.

8. A method for color-correcting multi-channel color image signals from a digital camera having multi-channel image sensors to account for variations in scene illuminant comprising the steps of:
   a) determining the scene illuminant; and
   b) determining an optimum color-correction transformation in response to the scene illuminant which transformation minimizes color errors between an original scene and a reproduced image when applied to the multi-channel color image signals to produce multi-channel color output signals, each of such multi-channel color output signals being dependent upon more than one of the multi-channel color image signals wherein the optimum color-correction transformation determining step includes combining the color errors for a set of typical scene colors and determining the optimum color-correction transformation that minimizes the combined error.

9. The method of claim 8 wherein the combined color error is the root mean square $\Delta E^*$ value for the set of typical scene colors, the root mean square $\Delta E^*$ value being given by $$\Delta E^*_{RMS} = \sqrt{\sum_{i=0}^{N} \Delta E^{*2}_i}$$

where N is the number of typical scene colors, i is a particular typical scene color, and $$\Delta E^*_i = \sqrt{(L^*_{si} - L^*_{di})^2 + (a^*_{si} - a^*_{di})^2 + (b^*_{si} - b^*_{di})^2}$$

is the CIELAB color difference between the scene color values for the $i^{th}$ typical scene color specified by $L^*_{si}$, $a^*_{si}$, and $b^*_{si}$, and the corresponding color of the reproduced image specified by $L^*_{di}$, $a^*_{di}$, and $b^*_{di}$.

10. A method for color-correcting multi-channel color image signals from a digital camera having multi-channel image sensors to account for variations in scene illuminant comprising the steps of:
    a) determining the scene illuminant; and
    b) determining an optimum color-correction transformation in response to the scene illuminant which transformation minimizes color errors between an original scene and a reproduced image when applied to the multi-channel color image signals to produce multi-channel color output signals, each of such multi-channel color output signals being dependent upon more than one of the multi-channel color image signals wherein the color-correction transformation is a color-correction matrix having adjustable matrix coefficients.

11. The method of claim 10 wherein the optimum color-correction transformation is determined by determining the adjustable matrix coefficients that minimize the color errors between the original scene and the reproduced image.

12. The method of claim 11 wherein the matrix coefficients that minimize the color errors between the original scene and the reproduced image are determined by minimizing the color errors for a set of typical scene colors.

13. The method of claim 12 wherein the optimum color-correction transformation determing step includes minimizing color errors by minimizing the root mean square $\Delta E^*$ value for the set of typical scene colors, the root mean square $\Delta E^*$ value being given by $$\Delta E^*_{RMS} = \sqrt{\sum_{i=0}^{N} \Delta E^{*2}_i}$$

where N is the number of typical scene colors, i is a particular typical scene color, and $$\Delta E^*_i = \sqrt{(L^*_{si} - L^*_{di})^2 + (a^*_{si} - a^*_{di})^2 + (b^*_{si} - b^*_{di})^2}$$

is the CIELAB color difference between the scene color values for the $i_{th}$ typical scene color specified by $L^*_{si}$, $a^*_{si}$, and $b^*_{si}$, and the corresponding color of the reproduced image specified by $L^*_{di}$, $a^*_{di}$, and $b^*_{di}$.

14. The method of claim 1 wherein the color-correction transformation is an adjustable three-dimensional look-up table that stores output color values for a lattice of input color values.

15. The method of claim 1 wherein information describing the determined scene illuminant is stored as part a data structure used to store the color image signals.

16. The method of claim 15 wherein the information describing the determined scene illuminant is an illuminant color temperature.

17. The method of claim 15 wherein the information describing the determined scene illuminant is an illuminant spectrum.

18. The method of claim 15 wherein the information describing the determined scene illuminant is an identifier for one of a set of possible scene illuminants.

19. The method of claim 1 wherein information describing the optimum color-correction transformation is stored as part a data structure used to store the color image signals.

20. The method of claim 19 wherein the information describing the optimum color-correction transformation includes matrix coefficient values for a color-correction matrix.

21. The method of claim 1 further including the step of applying the optimum color-correction transformation to the color image signals in the digital camera.

22. The method of claim 1 further including the step of applying the optimum color-correction transformation to the color image signals in a digital image processor adapted to receive the color image signals from the digital camera.

23. The method of claim 1 wherein the color-correction transformation transforms the color image signals from the digital camera to color image signals adapted for display on a video display device.

24. The method of claim 1 wherein the color-correction transformation transforms the color image signals from the digital camera to device-independent color image signals.

25. The method of claim 1 wherein the multi-channel image sensors are red, green, and blue image sensors.

26. A method for color-correcting multi-channel color image signals from a digital camera having multi-channel image sensors to account for variations in scene illuminant comprising the steps of:

a) determining the scene illuminant;

b) classifying the scene illuminant into one of a set of possible scene illuminants; and b) selecting an optimum illuminant-dependent color-correction transformation based on the classified scene illuminant from a set of color-correction transformations, each transformation having been pre-determined to minimize color errors between an original scene and a reproduced image for a particular classified scene illuminant when applied to the multi-channel color image signals to produce multi-channel color output signals, each of such multi-channel color output signals being dependent upon more than one of the multi-channel color image signals.

27. A method for color-correcting multi-channel color image signals from a digital camera having multi-channel image sensors to account for variations in scene illuminant comprising the steps of:

a) determining the scene illuminant;

b) determining channel-dependent neutral-balance transformations based on the determined scene illuminant to be applied to the multi-channel color image signals for form neutral-balanced color image signals, the neutral-balance transformations being adapted to produce equal signal levels for scene colors that are neutral; and c) determining an optimum illuminant-dependent color-correction transformation based on the determined scene illuminant which transformation minimizes color errors between an original scene and a reproduced image when applied to the multi-channel color image signals to produce multi-channel color output signals, each of such multi-channel color output signals being dependent upon more than one of the multi-channel color image signals.

28. An apparatus for color-correcting multi-channel color image signals from a digital camera having multi-channel image sensors to account for variations in scene illuminant, comprising:

a) means for determining the scene illuminant; and b) means for determining an optimum illuminant-dependent color-correction transformation based on the determined scene illuminant which transformation minimizes color errors between an original scene and a reproduced image when applied to the multi-channel color image signals to produce multi-channel color output signals, each of such multi-channel color output signals being dependent upon more than one of the multi-channel color image signals.

29. The invention of claim 28 further including a digital camera for producing multi-channel color signals.

* * * * *